United States Patent
Waldman et al.

(10) Patent No.: US 10,662,813 B2
(45) Date of Patent: May 26, 2020

(54) TURBINE ENGINE AND CONTAINMENT ASSEMBLY FOR USE IN A TURBINE ENGINE

(71) Applicant: General Electric Company, Schenectady, NY (US)

(72) Inventors: Thomas Chadwick Waldman, Boston, MA (US); James Edward Thompson, Liberty Township, OH (US); Douglas Ward, West Chester, OH (US); Nicholas Joseph Kray, Mason, OH (US); Scott Roger Finn, Montgomery, OH (US); Apostolos Pavlos Karafillis, Winchester, MA (US)

(73) Assignee: General Electric Company, Schectady, NY (US)

( * ) Notice: Subject to any disclaimer, the term of this patent is extended or adjusted under 35 U.S.C. 154(b) by 589 days.

(21) Appl. No.: 15/486,946

(22) Filed: Apr. 13, 2017

(65) Prior Publication Data

US 2018/0298782 A1    Oct. 18, 2018

(51) Int. Cl.
| | | |
|---|---|---|
| *F01D 25/24* | (2006.01) | |
| *F01D 21/04* | (2006.01) | |
| *F04D 29/02* | (2006.01) | |
| *F04D 29/52* | (2006.01) | |

(52) U.S. Cl.
CPC .......... *F01D 25/24* (2013.01); *F01D 21/045* (2013.01); *F04D 29/023* (2013.01); *F04D 29/526* (2013.01); *F05D 2220/323* (2013.01); *F05D 2240/307* (2013.01); *F05D 2250/232* (2013.01); *F05D 2250/283* (2013.01)

(58) Field of Classification Search
CPC ...... F01D 25/24; F01D 21/045; F04D 29/526; F04D 29/023; F05D 2250/232; F05D 2250/283; F05D 2220/323; F05D 2240/307
See application file for complete search history.

(56) References Cited

U.S. PATENT DOCUMENTS

| | | |
|---|---|---|
| 4,205,927 A | 6/1980 | Simmons |
| 4,484,856 A | 11/1984 | Patacca |
| 5,259,724 A | 11/1993 | Liston et al. |

(Continued)

FOREIGN PATENT DOCUMENTS

| | | | |
|---|---|---|---|
| CN | 102124197 A | 7/2011 | |
| CN | 105051360 A | 11/2015 | |
| GB | 2442112 | * 3/2008 | ............. F04D 29/52 |

OTHER PUBLICATIONS en.wikipedia.org/wiki/Stress_concentration (Year: 2016).*
Combined Chinese Office Action and Search Report Corresponding to Application No. 201810335663 dated Mar. 30, 2020.

*Primary Examiner* — Patrick Hamo
*Assistant Examiner* — David N Brandt
(74) *Attorney, Agent, or Firm* — Dority & Manning, P.A.

(57) ABSTRACT

A turbine engine that includes an engine casing including a shell and an angel wing member. The angel wing member includes a base defined at the shell and a tip positioned distal from the base. The turbine engine also includes a backsheet extending over the angel wing member such that an angled region is defined in the backsheet at an interface with the tip. The tip has a predetermined contour capable of mitigating stress concentrations in the angled region induced from said tip.

20 Claims, 6 Drawing Sheets

(56) References Cited

U.S. PATENT DOCUMENTS

| | | |
|---|---|---|
| 5,437,538 A | 8/1995 | Mitchell |
| 5,482,429 A | 1/1996 | Penda |
| 5,516,257 A | 5/1996 | Kasprow et al. |
| 5,823,739 A | 10/1998 | Van Duyn |
| 5,885,056 A | 3/1999 | Goodwin |
| 5,899,660 A | 5/1999 | Dodd |
| 6,206,631 B1 | 3/2001 | Schilling |
| 6,371,721 B1 | 4/2002 | Sathianathan et al. |
| 6,619,913 B2 | 9/2003 | Czachor et al. |
| 6,715,297 B1 | 4/2004 | Swinford et al. |
| 6,857,669 B2 | 2/2005 | Porte et al. |
| 8,393,648 B2 | 3/2013 | Marengo |
| 8,757,958 B2 | 6/2014 | Lussier |
| 8,876,467 B2 | 11/2014 | Riou et al. |
| 9,206,706 B2 | 12/2015 | Evans |
| 2003/0156940 A1 * | 8/2003 | Czachor ............. F01D 21/045 415/119 |
| 2013/0136577 A1 | 5/2013 | Evans |
| 2016/0032834 A1 | 2/2016 | Plante et al. |

\* cited by examiner

TURBINE ENGINE AND CONTAINMENT ASSEMBLY FOR USE IN A TURBINE ENGINE

BACKGROUND

The present disclosure relates generally to turbine engines and, more specifically, to a rotor section containment assembly having an improved load path transition between components of the assembly.

At least some known gas turbine engines, such as aircraft engines, include a stator assembly that extends circumferentially about a rotor assembly of the turbine engine. Known rotor assemblies include at least one row of rotor blades that extend radially outward from a blade root, for example, such that the rotor blades rotate proximate the stator assembly of the turbine engine. At least some known stator assemblies include a soft wall containment assembly that facilitates providing rotor containment during unlikely events, such as an unexpected blade-out condition. The soft wall containment assembly generally includes an engine casing, a honeycomb structure coupled to the engine casing, and a carbon fiber backsheet that extends across the honeycomb structure and a portion of the engine casing. More specifically, at least some known engine casings include an annular angel wing structure coupled to the backsheet. Annular angel wing structures are typically a constant thickness, and provide a potential concentrated load path to the backsheet in the event the engine casing is damaged, such as during an unexpected blade-out condition.

BRIEF DESCRIPTION

In one aspect, a turbine engine is provided. The turbine engine includes an engine casing including a shell and an angel wing member. The angel wing member includes a base defined at the shell and a tip positioned distal from the base. The turbine engine also includes a backsheet extending over the angel wing member such that an angled region is defined in the backsheet at an interface with the tip. The tip has a predetermined contour capable of mitigating stress concentrations in the angled region induced from said tip.

In one embodiment, which may include at least a portion of the subject matter of any of the preceding and/or following examples and aspects, the tip is contoured with a radius size of at least about 0.01 inch.

In one embodiment, the tip is contoured with a full radius defined between a first side and a second side of the angel wing member.

In one embodiment, the tip is contoured with a half radius oriented towards the backsheet.

In one embodiment, the tip is contoured with a chamfer oriented towards the backsheet.

In one embodiment, the angel wing member is oriented obliquely relative to the shell such that a cavity is at least partially defined between the shell and the angel wing member.

In one embodiment, a honeycomb structure is positioned within the cavity, wherein the backsheet further extends over the honeycomb structure and across the angel wing member, and a layer of containment material extending over the backsheet.

In one embodiment, an array of rotor blades is positioned radially inward from the engine casing, wherein the array of rotor blades and the layer of containment material are axially aligned relative to a centerline of the turbine engine.

In one embodiment, the engine casing includes a fan case.

In another aspect, a containment assembly for use in a turbine engine is provided. The containment assembly includes an engine casing including a shell and an angel wing member including a base defined at the shell and a tip positioned distal from the base. The assembly further includes a honeycomb structure coupled to the shell, and a backsheet including a first portion extending across the angel wing member, a second portion extending across the honeycomb structure, and an angled region defined between the first portion and the second portion. The angled region extends across the tip of the angel wing member. The tip has a predetermined contour capable of mitigating stress concentrations in the angled region induced from said tip.

In one embodiment, a layer of containment material extends over the backsheet.

In one embodiment, the containment material includes an aramid material.

In one embodiment, the tip has a predetermined contour capable of mitigating stress concentrations formed in the angled region induced from the tip.

In one embodiment, the tip is contoured with a full radius defined between a first side and a second side of the angel wing member.

In one embodiment, the tip is contoured with a half radius oriented towards the backsheet.

In yet another aspect, a method of forming a containment assembly for use in a turbine engine is provided. The method includes coupling a honeycomb structure to an engine casing, wherein the engine casing includes a shell and an angel wing member including a base defined at the shell and a tip positioned distal from the base. The method also includes coupling a backsheet to the angel wing member and the honeycomb structure, wherein the backsheet includes a first portion extending across the angel wing member, a second portion extending across the honeycomb structure, and an angled region defined therebetween and extending across the tip of the angel wing member. The method further includes shaping the tip of the angel wing member with a predetermined contour capable of mitigating stress concentrations formed in the angled region induced from the tip.

In one embodiment, contouring the tip of the angel wing member includes contouring the tip with a radius size of at least about 0.01 inch.

In one embodiment, contouring the tip of the angel wing member includes contouring the tip with a full radius defined between a first side and a second side of the angel wing member.

In one embodiment, contouring the tip of the angel wing member includes contouring the tip with a half radius oriented towards said backsheet.

In one embodiment, the method further includes extending a layer of containment material across the backsheet.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to a rotor section containment assembly that provides an improved load path transition between components of the assembly. More specifically, the containment assembly described herein includes an engine casing, such as a fan case, including a shell and an angel wing member that extends from the shell. The angel wing member is an annular structure and includes a base defined at the shell and a tip positioned distal from the base. The containment assembly also includes a backsheet extending over the angel wing member such that an angled region is formed in the backsheet at the tip of the angel wing member. The angel wing member described herein includes one or more design features that facilitate limiting damage to the backsheet induced by the angel wing member in the event the angel wing member is forced radially outward towards the backsheet, such as during an unexpected blade-out condition. The angel wing design features include a contoured tip and a non-uniform thickness. As such, stress concentrations in the backsheet induced from the angel wing member are facilitated to be mitigated, and a smooth load path transition is provided between the angel wing member and the backsheet, thereby reducing the likelihood of damage to the backsheet.

While the following embodiments are described in the context of a turbofan engine, it should be understood that the systems and methods described herein are also applicable to turboprop engines, turboshaft engines, turbojet engines, and ground-based turbine engines, for example.

Figure 1:
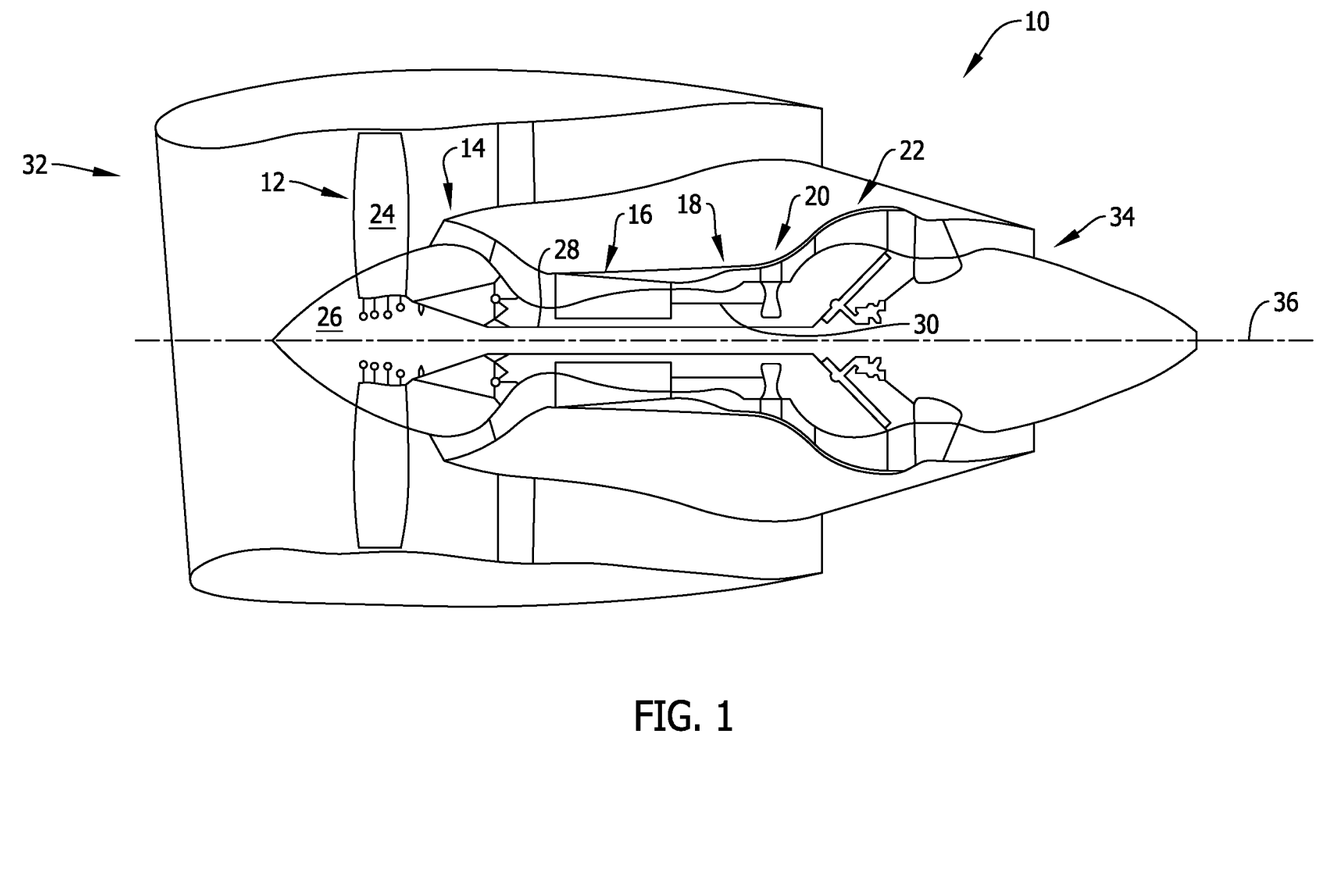
FIG. 1 is a schematic illustration of an exemplary turbine engine.

FIG. 1 is a schematic diagram of an exemplary turbine engine 10 including a fan assembly 12, a low-pressure or booster compressor assembly 14, a high-pressure compressor assembly 16, and a combustor assembly 18. Fan assembly 12, booster compressor assembly 14, high-pressure compressor assembly 16, and combustor assembly 18 are coupled in flow communication. Turbine engine 10 also includes a high-pressure turbine assembly 20 coupled in flow communication with combustor assembly 18 and a low-pressure turbine assembly 22. Fan assembly 12 includes an array of fan blades 24 extending radially outward from a rotor disk 26. Low-pressure turbine assembly 22 is coupled to fan assembly 12 and booster compressor assembly 14 through a first drive shaft 28, and high-pressure turbine assembly 20 is coupled to high-pressure compressor assembly 16 through a second drive shaft 30. Turbine engine 10 has an intake 32 and an exhaust 34. Turbine engine 10 further includes a centerline 36 about which fan assembly 12, booster compressor assembly 14, high-pressure compressor assembly 16, and turbine assemblies 20 and 22 rotate.

During operation, air entering turbine engine 10 through intake 32 is channeled through fan assembly 12 towards booster compressor assembly 14. Compressed air is discharged from booster compressor assembly 14 towards high-pressure compressor assembly 16. Highly compressed air is channeled from high-pressure compressor assembly 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbine engine 10 via exhaust 34.

Figure 2:
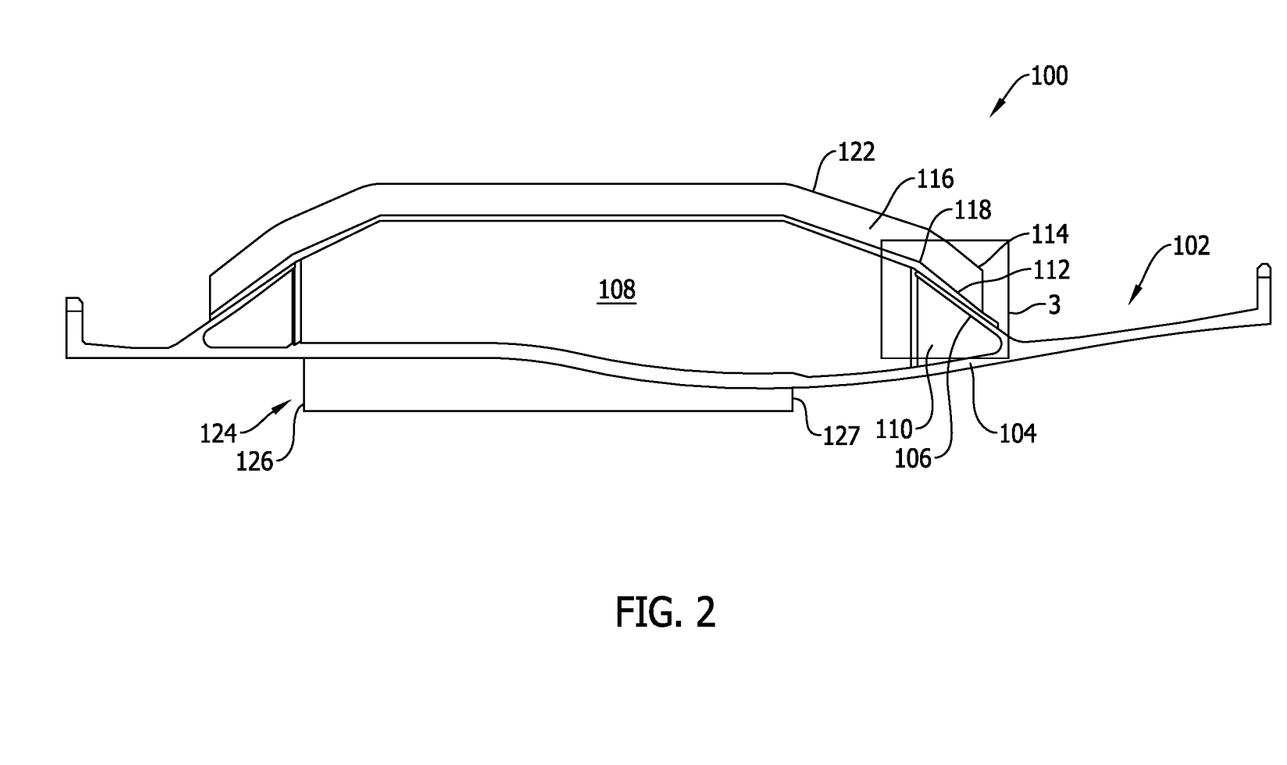
FIG. 2 is a cross-sectional illustration of an exemplary containment assembly that may be used in the turbine engine shown in FIG. 1.

FIG. 2 is a cross-sectional illustration of an exemplary containment assembly 100 that may be used in turbine engine 10 (shown in FIG. 1). In the exemplary embodiment, containment assembly 100 includes an engine casing 102 (hereinafter also referred to as a "fan case") including a shell 104 and an angel wing member 106, and a honeycomb structure 108 coupled to shell 104. More specifically, angel wing member 106 is oriented obliquely relative to shell 104 such that a cavity 110 is at least partially defined between shell 104 and angel wing member 106. Honeycomb structure 108 is positioned within cavity 110 to provide noise attenuation when turbine engine 10 is in operation.

Containment assembly 100 further includes a backsheet 112 extending over angel wing member 106 and honeycomb structure 108. More specifically, backsheet 112 includes a first portion 114 extending across angel wing member 106, a second portion 116 extending across honeycomb structure 108, and an angled region 118 defined between first portion 114 and second portion 116. In addition, backsheet 112 is coupled to angel wing member 106 with a layer 120 (shown in FIGS. 3-6) of adhesive material.

In the exemplary embodiment, angel wing member 106 and backsheet 112 are fabricated from any material that enables containment assembly 100 to function as described herein. For example, angel wing member 106 is fabricated from a metallic material, such as aluminum, and backsheet 112 is fabricated from a composite material, such as a carbon fiber reinforced polymer (CFRP) material. As such, and as will be explained in more detail below, a thickness of angel wing member 106 is tailored to facilitate reducing a metallic material-to-composite material ratio at an interface defined between angel wing member 106 and backsheet 112 and thus facilitates providing a smooth load path transition therebetween.

Moreover, backsheet 112 provides a surface in which one or more subsequent layers of material may be positioned circumferentially about engine casing 102. For example, containment assembly 100 also includes a layer 122 of containment material extending over backsheet 112. The containment material may be any material that enables containment assembly 100 to function as described herein. An exemplary containment material includes, but is not limited to, an aramid material (i.e., Kevlar®).

In the exemplary embodiment, an array of rotor blades 124, such as fan blades 24 (shown in FIG. 1), is positioned radially inward from engine casing 102. The array of rotor blades 124 and layer 122 of containment material are axially aligned relative to centerline 36 (shown in FIG. 1) of turbine engine 10. More specifically, layer 122 of containment material traverses a leading edge 126 and a trailing edge 127 of rotor blades 124. As such, in the event of an unexpected blade-out condition, layer 122 of containment material is positioned to impede radially outward movement of rotor blades 124.

FIGS. 3-6 are cross-sectional illustrations of a portion of containment assembly 100 (shown in FIG. 2) taken along Area 3, in accordance with different embodiments of the disclosure. As described above, angel wing member 106 includes one or more design features that facilitate limiting damage to backsheet 112 induced by angel wing member 106. In the exemplary embodiment, referring to FIG. 3, angel wing member 106 includes a base 126 defined at shell 104 and a tip 128 positioned distal from base 126. Moreover, as described above, backsheet 112 extends over angel wing member 106 such that angled region 118 is defined in backsheet 112 at an interface with tip 128. The engine can further include a bulkhead that extends in the radial direction between backsheet 112 and shell 104. In some embodiments, tip 128 is contoured to mitigate stress concentrations in angled region 118 induced from tip 128, such as when angel wing member 106 is forced radially outward during an unexpected blade-out condition. In some examples, the bulkhead can include a notch; the tip 128 can be seated within the notch and moveable within.

Figure 4:
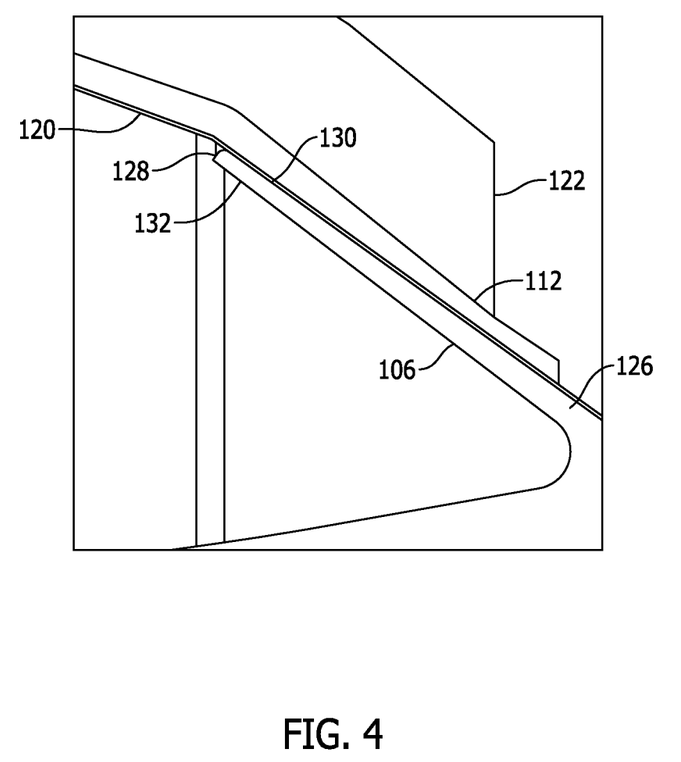
FIG. 4 is a cross-sectional illustration of the portion of the containment assembly shown in FIG. 3, in accordance with a second embodiment of the disclosure.
Figure 5:
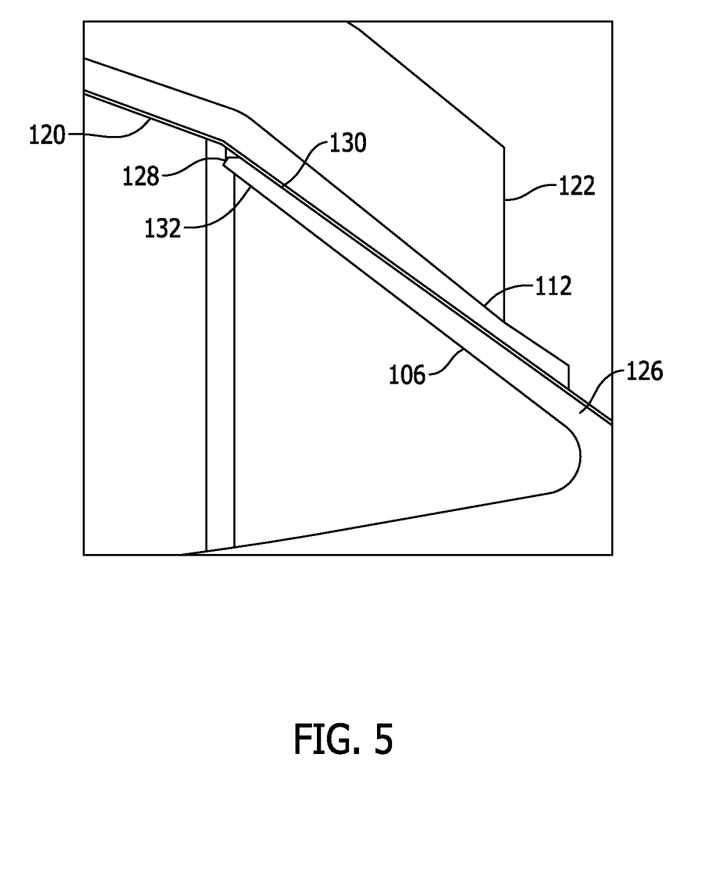
FIG. 5 is a cross-sectional illustration of the portion of the containment assembly shown in FIG. 3, in accordance with a third embodiment of the disclosure.

In the exemplary embodiment, tip 128 is contoured with any radius size that enables containment assembly to function as described herein. For example, in one embodiment, tip 128 is contoured with a radius size of at least about 0.01 inch. Referring again to FIG. 3, tip 128 is contoured with a full radius defined between a first side 130 and a second side 132 of angel wing member 106. Referring to FIG. 4, tip 128 is contoured with a half radius defined on first side 130 of angel wing member 106 and oriented towards backsheet 112. Referring to FIG. 5, tip 128 is contoured with a chamfer defined on first side 130 of angel wing member 106 and oriented towards backsheet 112. As such, a blunt interface is defined between angel wing member 106 and backsheet 112 in the event angel wing member 106 is deflected radially outward towards backsheet 112, thereby reducing stress concentrations in angled region 118 when compared to an angel wing member having a sharp-edged tip.

Moreover, in the exemplary embodiment, first side 130 and second side 132 of angel wing member 106 define a thickness of angel wing member 106. In one embodiment, the thickness of angel wing member 106 is non-uniform between base 126 and tip 128. Defining the thickness of angel wing member 106 in a non-uniform manner facilitates tailoring the stiffness of angel wing member 106, and also facilitates reducing the metallic material-to-composite material ratio at the interface defined between angel wing member 106 and backsheet 112. As such, a gradual load transfer is formed between angel wing member 106 and backsheet 112 in the event angel wing member 106 is forced radially outward towards backsheet 112. For example, reducing the stiffness of angel wing member 106 facilitates distributing stress concentrations in backsheet 112 induced from angel wing member 106 across first portion 114 of backsheet 112, rather than having the stress concentrations primarily located at angled region 118.

Figure 3:
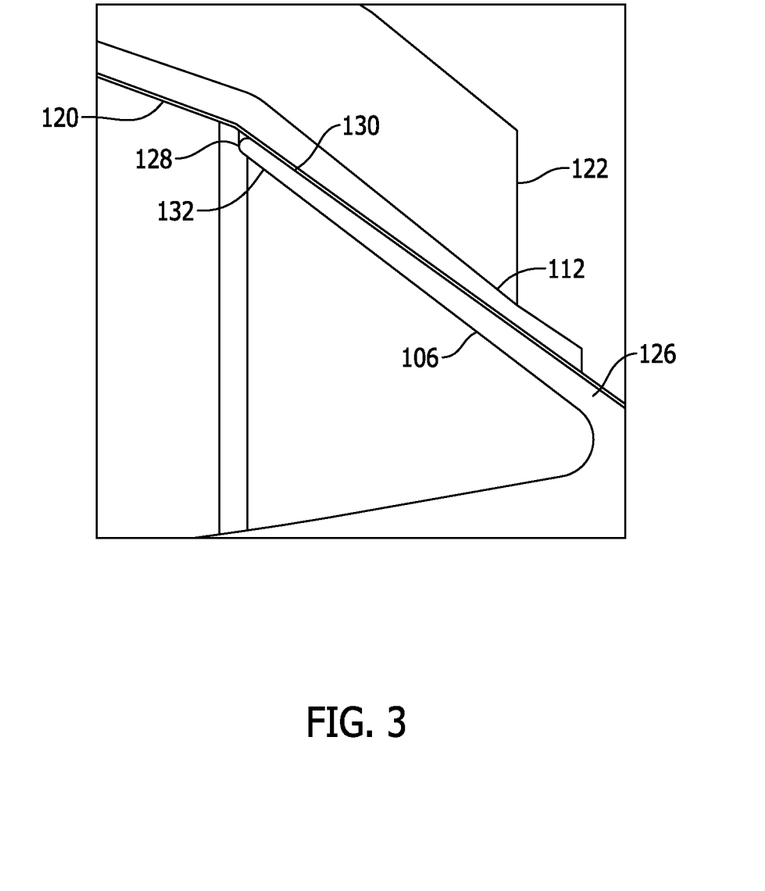
FIG. 3 is a cross-sectional illustration of a portion of the containment assembly shown in FIG. 2 taken along Area 3, in accordance with a first embodiment of the disclosure.
Figure 6:
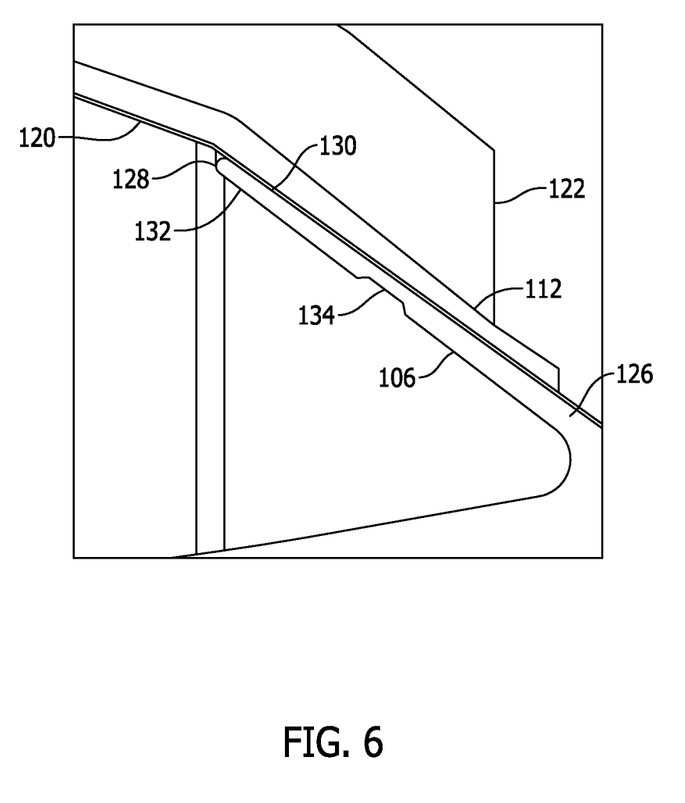
FIG. 6 is a cross-sectional illustration of the portion of the containment assembly shown in FIG. 3, in accordance with a fourth embodiment of the disclosure.

In the exemplary embodiment, referring to FIG. 3, angel wing member 106 is tapered such that the thickness of angel wing member 106 is progressively reduced from base 126 to tip 128. Referring to FIG. 6, at least one notch 134 is formed in angel wing member 106 to reduce the thickness of angel wing member 106. More specifically, backsheet 112 extends across first side 130 of angel wing member 106, and notch 134 is formed on second side 132 of angel wing member 106.

An exemplary technical effect of the assembly and methods described herein includes at least one of: (a) providing containment of a rotor assembly; (b) providing a smooth load path transition between metallic and composite components in a containment assembly; and (c) reducing the likelihood of damage to a backsheet in the containment assembly in the event an angel wing member is forced radially outward towards the backsheet.

Exemplary embodiments of a containment assembly for use with a turbine engine and related components are described above in detail. The assembly is not limited to the specific embodiments described herein, but rather, components of systems and/or steps of the methods may be utilized independently and separately from other components and/or steps described herein. For example, the configuration of components described herein may also be used in combination with other processes, and is not limited to practice with a fan section of a turbine engine. Rather, the exemplary embodiment can be implemented and utilized in connection with many applications where providing smooth load transition between component in an assembly is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine defining an axial direction and a radial direction, the turbine engine comprising: an engine casing comprising: a shell; and an angel wing member comprising a base defined at said shell and a tip positioned distal from said base; and a backsheet extending over said angel wing member such that an angled region is defined in said backsheet at an interface with said tip, wherein said tip has a predetermined contour capable of mitigating stress concentrations in said angled region induced from said tip in the event said angel wing member is deflected in the radial direction away from said shell and towards said backsheet; wherein said tip is moveable relative to a bulkhead that is adjacent to said tip, said bulkhead extending in the radial direction between said backsheet and said shell.

2. The turbine engine in accordance with claim 1, wherein said tip is contoured with a radius size of at least 0.01 inch.

3. The turbine engine in accordance with claim 2, wherein said tip is contoured with a full radius defined between a first side and a second side of said angel wing member.

4. The turbine engine in accordance with claim 2, wherein said tip is contoured with a half radius oriented towards said backsheet.

5. The turbine engine in accordance with claim 1, wherein said tip is contoured with a chamfer oriented towards said backsheet.

6. The turbine engine in accordance with claim 1, wherein said angel wing member is oriented obliquely relative to said shell such that a cavity is at least partially defined between said shell and said angel wing member.

7. The turbine engine in accordance with claim 6 further comprising:
   a honeycomb structure positioned within said cavity, wherein said backsheet further extends over said honeycomb structure and across said angel wing member; and
   a layer of containment material extending over said backsheet.

8. The turbine engine in accordance with claim 7 further comprising an array of rotor blades positioned radially inward from said engine casing, wherein said array of rotor blades and said layer of containment material are axially aligned relative to a centerline of the turbine engine.

9. The turbine engine in accordance with claim 1, wherein said engine casing comprises a fan case.

10. A containment assembly for use in a turbine engine defining an axial direction and a radial direction, said containment assembly comprising: an engine casing comprising: a shell; and an angel wing member comprising a base defined at said shell and a tip positioned distal from said base; a honeycomb structure coupled to said shell; and a backsheet comprising a first portion extending across said angel wing member, a second portion extending across said honeycomb structure, and an angled region defined between said first portion and said second portion, wherein said angled region extends across said tip of said angel wing member, wherein said tip has an at least partially arcuate cross-sectional profile capable of mitigating stress concentrations in said angled region induced from said tip in the event said angel wing member is deflected in the radial direction away from said shell and towards said backsheet; wherein said tip is moveable relative to a bulkhead that is adjacent to said tip, said bulkhead extending in the radial direction between said backsheet and said shell.

11. The containment assembly in accordance with claim 10 further comprising a layer of containment material extending over said backsheet.

12. The containment assembly in accordance with claim 11, wherein the containment material includes an aramid material.

13. The turbine engine in accordance with claim 10, wherein said tip is contoured with a full radius defined between a first side and a second side of said angel wing member.

14. The turbine engine in accordance with claim 10, wherein said tip is contoured with a half radius oriented towards said backsheet.

15. A method of forming a containment assembly for use in a turbine engine, said method comprising: coupling a honeycomb structure to an engine casing, wherein the engine casing includes a shell and an angel wing member including a base defined at the shell and a tip positioned distal from the base; coupling a backsheet to the angel wing member and the honeycomb structure, wherein the backsheet includes a first portion extending across the angel wing member, a second portion extending across the honeycomb structure, and an angled region defined therebetween and extending across the tip of the angel wing member; and shaping the tip of the angel wing member with a predetermined contour capable of mitigating stress concentrations formed in the angled region induced from the tip in the event said angel wing member is deflected in the radial direction away from said shell and towards said backsheet; wherein said tip is moveable relative to a bulkhead that is adjacent to said tip, said bulkhead extending in the radial direction between said backsheet and said shell.

16. The method in accordance with claim 15, wherein contouring the tip of the angel wing member comprises contouring the tip with a radius size of at least 0.01 inch.

17. The method in accordance with claim 16, wherein contouring the tip of the angel wing member comprises contouring the tip with a full radius defined between a first side and a second side of the angel wing member.

18. The method in accordance with claim 16, wherein contouring the tip of the angel wing member comprises contouring the tip with a half radius oriented towards said backsheet.

19. The method in accordance with claim 17 further comprising extending a layer of containment material across the backsheet.

20. The turbine engine in accordance with claim 1, wherein said tip is moveable within a notch of the bulkhead.

\* \* \* \* \*